Sept. 4, 1934.  J. E. DANILLS  1,972,645
GOLD PAN
Filed Oct. 6, 1932

Inventor,
Joseph E. Danills

Patented Sept. 4, 1934

1,972,645

UNITED STATES PATENT OFFICE 1,972,645

GOLD PAN

Joseph E. Danills, Grants Pass, Oreg.

Application October 6, 1932, Serial No. 636,515

1 Claim. (Cl. 209—447)

The pan is formed with an outwardly flaring side wall.

In the wall beginning about one inch from the bottom, a projection extends outwardly and parallel to the bottom of the pan for about one half inch and thence back on substantially a ninety degree angle to the side wall of the pan, and again outwardly parallel to the bottom of the pan and back on the same angle to the side wall.

This formation is repeated until the desired number of riffles are formed.

The number will depend on the size of the pan and may vary from three riffles for an eight inch pan to six for an eighteen inch pan.

The projections form riffles which may be extended about half way around the side of the pan.

The riffles come to a sharp edge on the interior of the pan.

The riffles may be made by corrugations or indentures in the pan, or the equivalent effect by projections in a similar order.

The other half of the pan flange is plain.

Figure 1:
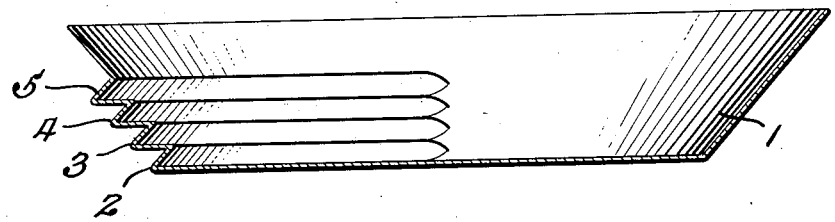
Figure 2:
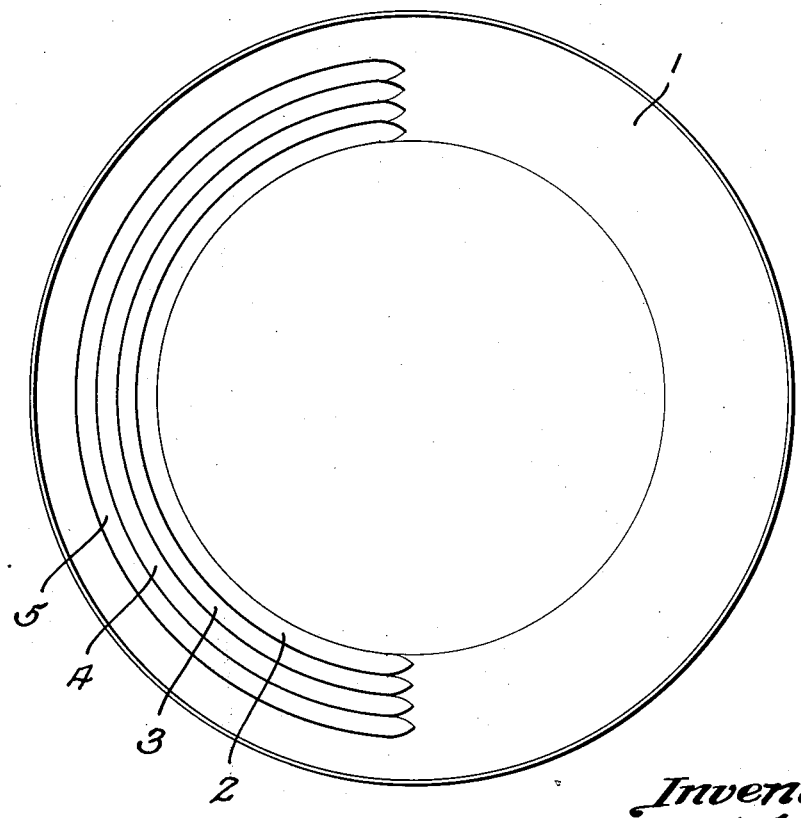

The invention is illustrated in the drawing of which Fig. 1 is a vertical section and Fig. 2 is a plan view.

The object of this riffle is to make it impossible to lose any of the gold or heavier metals, also to increase the speed of panning ninety per cent.

After the gold has been well settled in the pan, the pan can be tipped up to an angle of sixty degrees and the pulp all discharged without losing any of the gold or heavier metals.

I claim:

A gold pan having a circular flat bottom, outwardly sloping side walls, a series of riffles in the lower portion of the side walls, said riffles having their bottom walls parallel to the bottom of the pan and their upper walls substantially at right angles to the side walls and having the interior walls of the riffles meeting in sharp edges.

JOSEPH E. DANILLS.